E. R. Stilwell,

Steam-Boiler Condenser.

No. 2,159. Reissued Jan. 23, 1866.

Witnesses,
Thos. D. Mitchell
Joseph H. Stile

Inventor
Edwin R. Stilwell

AM. PHOTO-LITHO. CO. N.Y. (OSBORNE'S PROCESS.)

UNITED STATES PATENT OFFICE.

EDWIN R. STILWELL, OF DAYTON, OHIO.

IMPROVEMENT IN FEED-WATER HEATERS AND FILTERERS.

Specification forming part of Letters Patent No. 44,561, dated October 4, 1864; Reissue No. 2,159, dated January 23, 1866.

*To all whom it may concern:*

Be it known that I, EDWIN R. STILWELL, of Dayton, in the county of Montgomery, in the State of Ohio, have invented a new and Improved Mode of Heating and Purifying Water for Steam-Boilers; and I do hereby declare that the following is a full and exact description thereof, reference being had to the accompanying drawings, and to the letters of reference marked thereon.

The nature of my invention consists in the mode of heating and purifying the feed-water for steam-boilers.

To enable others skilled in the art to make and use my invention, I will proceed to describe its construction and operation.

Figure 1:
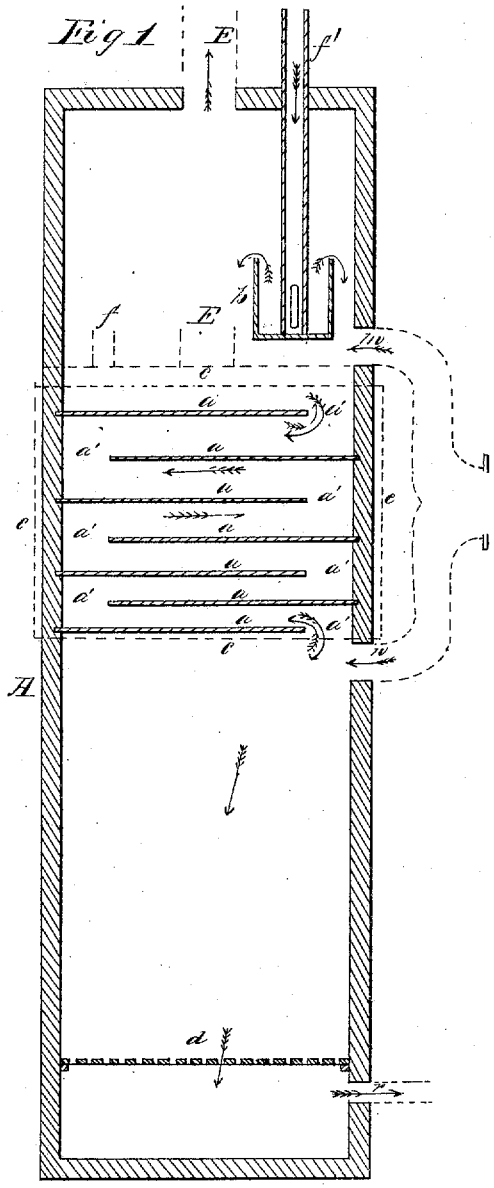
Figure 2:
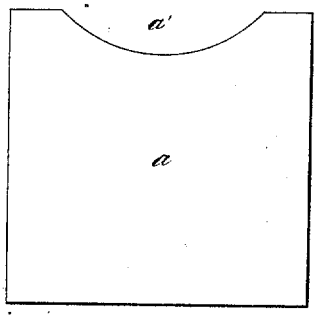

Figure 1 represents a vertical section of a feed-water heater and filter. Fig. 2 represents a perspective view of a depositing-plate.

A represents a tight vessel of rectangular form. The vessel has an opening, through which the plates *a a a* are removed when necessary to cleanse them of the deposits. This opening is closed by a plate, (shown by black dotted lines *c c c c*.) An orifice for a water-pipe is shown at *r*. A series of plates, *a a a*, designed chiefly as depositing-surfaces, and which may be constructed of variable forms. The only essential requisite is that provision be made for the free passage of the steam and water in opposite directions. These plates are constructed as shown at Fig. 2. *a'* is a part cut away to form an orifice for the passage of the steam and water, and these plates are placed into the vessel A with the orifices alternating, as represented at *a'*, Fig. 1.

A perforated plate is shown at *d*, on which is placed any suitable material for filtering.

The water enters the vessel A at *f* and passes to and fro over the plates successively in the direction shown by the black arrows. The steam enters at *n* and moves in the direction indicated by the red arrows, meeting at *a'* of each successive plate the water as it falls and dashing it into fine particles, and thereby heating it most effectually, and thus depriving the water of its foreign elements, which are deposited on the plates *a a a*. As the steam reaches the upper part of the vessel it escapes through the pipe *e*. When the water has passed the plates, it passes through a filtering material, which deprives the water of the loose materials which pass the plates and through the perforated plate *d*, and out of the pipe *r* to the steam-boiler.

The object of attaching a pipe at *m*, as described, is to provide for a freer passage of the steam than if the entire volume of steam had to pass the rounds of the plates.

Having thus fully described my invention, what I claim, and desire to secure by Letters Patent, is—

1. The depositing-plates *a a a*, constructed and arranged substantially as described, and for the purposes specified.

2. The arrangement of the steam-pipes *m* and *n* with reference to the plates *a a a*, substantially as described, and for the purposes specified.

3. The combination of the vessel A, the plates *a a a*, the plate *d*, the steam-pipes *m*, *n*, and *e*, and water-pipes *f* and *r*, substantially as described.

EDWIN R. STILWELL.

Witnesses:

THOS. D. MITCHELL,

JOSEPH H. STEELE.